(12) United States Patent
Dominguez et al.

(10) Patent No.: US 11,551,346 B2
(45) Date of Patent: Jan. 10, 2023

(54) SYSTEMS AND METHODS OF ULTRASONIC DATA EVALUATION OF COMPOSITE AIRCRAFT COMPONENTS

(71) Applicants: AIRBUS (S.A.S.), Blagnac (FR); AIRBUS OPERATIONS (S.A.S.), Toulouse (FR); AIRBUS OPERATIONS SL, Getafe (ES)

(72) Inventors: Nicolas Dominguez, Plaisance du Touch (FR); Silvere Barut, Lasserre (FR); Franck Bentouhami, Chavagnes en Paillers (FR); Rémi Cabrero, Reze (FR); Grégoire Noblet, Nantes (FR); David Lopez Bravo, Madrid (ES)

(73) Assignees: AIRBUS (S.A.S.), Blagnac (FR); AIRBUS OPERATIONS (S.A.S.), Toulouse (FR); AIRBUS OPERATIONS S.L., Getafe (ES)

( * ) Notice: Subject to any disclaimer, the term of this patent is extended or adjusted under 35 U.S.C. 154(b) by 1092 days.

(21) Appl. No.: 16/192,429

(22) Filed: Nov. 15, 2018

(65) Prior Publication Data
US 2020/0160506 A1 May 21, 2020

(51) Int. Cl.
*G06T 7/00* (2017.01)
*B64F 5/60* (2017.01)
*G01N 29/06* (2006.01)

(52) U.S. Cl.
CPC .............. *G06T 7/0006* (2013.01); *B64F 5/60* (2017.01); *G01N 29/069* (2013.01); *G01N 2291/0231* (2013.01); *G01N 2291/0289* (2013.01); *G06T 2207/10132* (2013.01)

(58) Field of Classification Search
CPC ....... G01T 7/0006; B64F 5/60; G01N 29/069; G01N 2291/0231; G01N 2291/0289; G06T 2207/10132
See application file for complete search history.

(56) References Cited

U.S. PATENT DOCUMENTS

| 7,562,576 B2 | 7/2009 | Fetzer et al. | |
| 2013/0144582 A1* | 6/2013 | Jain | B64C 5/10 703/8 |

FOREIGN PATENT DOCUMENTS

| EP | 1873519 A2 * | 1/2008 | ......... G01N 29/0645 |
| EP | 2472254 A2 * | 7/2012 | ............. G01N 29/07 |

* cited by examiner

*Primary Examiner* — Catherine T. Rastovski
*Assistant Examiner* — Kaleria Knox
(74) *Attorney, Agent, or Firm* — Nixon & Vanderhye P.C.

(57) ABSTRACT

A computer system is provided for processing ultrasonic data of an ultrasonic probe applied to an area of an aircraft component that includes carbon fiber reinforced polymer. C-scan data is obtained and a preliminary mesh is defined over the C-scan data by taking into account the underlying structural or mechanical characteristics of the analyzed component. The mesh is further refined and data gathered for each mesh cell. A heat map is generated based on the mesh.

16 Claims, 17 Drawing Sheets

SYSTEMS AND METHODS OF ULTRASONIC DATA EVALUATION OF COMPOSITE AIRCRAFT COMPONENTS

TECHNICAL OVERVIEW

The technology described herein relates to analysis of aircraft components. More particularly, the technology described herein relates to evaluation of aircraft element that include composite materials, such as wings for instance.

INTRODUCTION

Modern airplanes are technically complex. For example, the wings of an aircraft have advanced from wood, to metals (e.g., aluminum, steel, titanium and associated alloys), and now composite materials. Using composite materials can present advantages over other materials. But they also can pose different and complex problems. For example, problems with composite materials may include volume and layer porosity problems, inclusions, and delaminations (e.g., which can decrease the strength of the composite). Such problems can be detrimental to the life of an aircraft and the production of new aircraft.

Accordingly, it will be appreciated that new and improved techniques, systems, and processes are continually sought after—especially in the area of detecting and evaluating aircraft components to identify areas of the plane.

SUMMARY

Certain example embodiments provide a computer system for processing ultrasonic data of an ultrasonic probe applied to an area of an aircraft component that includes carbon fiber reinforced polymer. The computer system includes a processing system with at least one hardware processor and the processing system may be configured to obtain c-scan data of an area of the aircraft component that includes the carbon fiber reinforced polymer. The processing system may be configured to generate a first mesh with respect to the c-scan data, the first mesh being generated with respect to the structural characteristics of the area of the aircraft component. The processing system may also be configured to generate a refined mesh by dividing cells with in the first mesh and calculate, for each cell of the refined mesh, amplitude data that is based on an amplitude C-Scan. The processing system may further calculate, for each cell of the refined mesh, time of flight (ToF) data that is based on a ToF C-Scan. The processing system may generate and display a heatmap that is based on the calculated amplitude and/or ToF data, wherein each cell or group of cells of the refined mesh represents a point within the heatmap.

In certain example embodiments, a first mesh cell of the generated refined mesh may overlap with other mesh cells in the generated refined mesh. In certain examples, the overlap amount is calculated as a function of an indication size that is desired to be detected.

In certain example embodiments, the processing system may be configured to perform a clustering process for each mesh cell, wherein the generated heatmap is based on the performed clustering process. In certain example embodiments, the clustering processing may first include, for a plurality mesh cells, determining a first set of cells for which there are more than a threshold number of pixels with higher than an attenuation threshold. The clustering processing may also include, for the first set of cells, determining whether neighboring cells have a quantity of pixels that are more than a threshold. The clustering process may further include forming a cluster of cells based on those ones of the first set of cells that have neighboring cells with more than the quantity. In certain example embodiments, the processing system may, for a plurality of mesh cells of the refined mesh, calculate a distance to mean value that is a function of the mean of historical values and the standard deviation. In certain examples, the generated heatmap may be based on the calculated distance to mean and the clustering process.

In certain example embodiments, the aircraft component is a wing of an aircraft (or a wing that will be used for an aircraft).

In certain example embodiments, a method of processing ultrasonic data of an ultrasonic probe applied to an area of an aircraft component that includes carbon fiber reinforced polymer is provided. The method may include obtaining c-scan data of an area of the aircraft component that includes the carbon fiber reinforced polymer. The method may include generating a first mesh with respect to the c-scan data, the first mesh being generated with respect to the structural characteristics of the area of the aircraft component; and generating a refined mesh by dividing cells with in the first mesh. The method may further include calculating, for each cell of the refined mesh, amplitude data that is based on an amplitude C-Scan; and calculating, for each cell of the refined mesh, time of flight (ToF) data that is based on a ToF C-Scan. The method may also include generating and displaying a heatmap that is based on the calculated amplitude and/or ToF data, wherein each cell or group of cells of the refined mesh represents a location within the heatmap.

In the method, a first mesh cell of the generated refined mesh may overlap with other mesh cells in the generated refined mesh. In the method, an amount of overlap is calculated as a function of a size of indications to be detected.

The method may further include performing a clustering process for each mesh cell, wherein the generated heatmap is based on the performed clustering process. The clustering process of the method may include, for a plurality mesh cells, determining a first set of cells for which there are more than a threshold number of pixels with higher than an attenuation threshold. The clustering process of the method may include, for the first set of cells, determining whether neighboring cells have a quantity of pixels that are more than a threshold. The clustering process of the method may include forming a cluster of cells based on those ones of the first set of cells that have neighboring cells with more than the quantity.

The method may further include, for a plurality of mesh cells of the refined mesh, calculating a distance to mean value that is a function of the mean of historical values and the standard deviation.

In the method, the generated heatmap is based on the calculated distance to mean and the clustering process.

In the method, wherein the first mesh includes differently sized mesh areas that correspond to respective structural characteristics of different areas of the aircraft component.

In certain example embodiments a non-transitory computer readable storage medium storing computer readable instructions for using with a computer system that includes at least one hardware processor is provided. The stored computer readable instructions may comprise instructions that cause the computer system to obtain c-scan data of an area of the aircraft component that includes the carbon fiber reinforced polymer; and generate a first mesh with respect to the c-scan data, the first mesh being generated with respect to the structural characteristics of the area of the aircraft component. The instructions included in the stored instructions may generate a refined mesh by dividing cells with in the first mesh; calculate, for each cell of the refined mesh, amplitude data that is based on an amplitude C-Scan; and calculate, for each cell of the refined mesh, time of flight (ToF) data that is based on a ToF C-Scan. The instructions in the stored instructions may also generate and display a heatmap that is based on the calculated amplitude and/or ToF data, wherein each cell or group of cells of the refined mesh represents a point within the heatmap.

The instructions in the stored instructions may also include instructions for performing a clustering process for each mesh cell, wherein the generated heatmap is based on the performed clustering process.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

Figure 1:
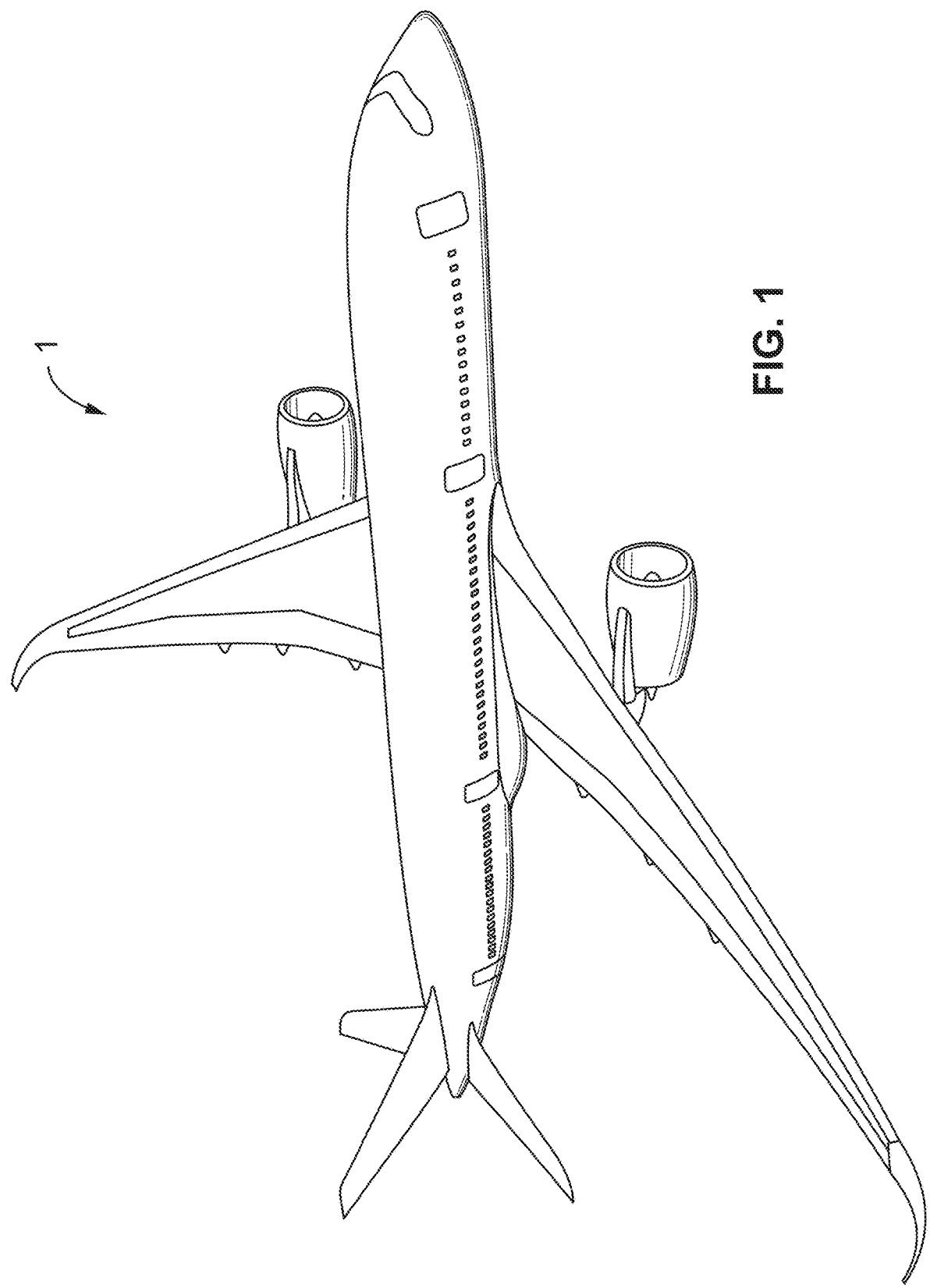
FIG. 1 illustrates an example aircraft that includes aircraft components that may be analyzed according to certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

In many places in this document, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 15.

In certain example embodiments, a system and/or process is provided for analyzing ultrasonic data to determine if there are defects (e.g., volume porosity, layer porosity, inclusions, delamination) in an aircraft component. The techniques herein provide for generation of a mesh with respect to the ultrasonic data of an aircraft component (such as a wing). The mesh may be generated by taking into account the underlying structural makeup of the component and then further subdividing the mesh to create a plurality of cells. In certain examples, the cells may overlap one another. For each mesh cell statistical (e.g., standard deviation, mean, min, max, median values) and other data (e.g., pixel distribution, scaled, centered values, etc. . . . ) may be acquired. In certain examples, additional processing rules may be applied to this collected data. Such rules may be used to generate a heatmap or other visual representation. Different colors on the heatmap may be used to represent different indications of the underlying c-scan data. In certain examples, the heatmap may be representative of the quality of a given component. In certain examples, the heatmap and/or underlying data may be used for Statistical Process Control (SPC) (i.e., using historical data). In certain examples, the heatmap may be computed based on historical behavior of each cell and/or selected in comparison to specific criteria for the respective cells. In certain examples, the generated heatmaps (or data based thereon) may be combined together to create new heatmaps. In certain examples, the underlying processing is automated to generate a display that highlights (e.g., via a red spot on a heat map) areas where additional inspection and analysis may be needed for the underlying aircraft component.

In certain example embodiments, the techniques herein allow for faster and/or more efficient identification of structural issues in aircraft components that are constructed out of carbon fiber reinforced polymer. The generation and display of heatmaps via the techniques described herein may facilitate such benefits.

In accordance to FIG. 1, an example aircraft 1 includes aircraft components that may be analyzed according to certain example embodiments. Components of the aircraft may include components that are manufactured or constructed out of materials that include carbon fiber reinforced polymer (CFRP). Aircraft that are constructed out of CFRP materials can be advantageous as such materials allow for lighter and thus more fuel efficient aircraft. An example of such an aircraft is the Airbus A350, which uses CFRP materials for wing and fuselage components. In certain examples, an airframe (e.g., all of the components of the aircraft) may be comprised of 50% or more CFRP materials. In other examples, the aircraft may use less than 50% CFRP materials.

While using CFRP materials for aircraft components provide benefits in terms of performance for the aircraft, they also can come with additional challenges (e.g., that are different from steel and/or aluminum). On aspect of combating these challenges involves testing the components that are made up of CFRP materials using non-destructive testing techniques—for example, by inspecting the component using an ultrasonic probe.

Figure 2:
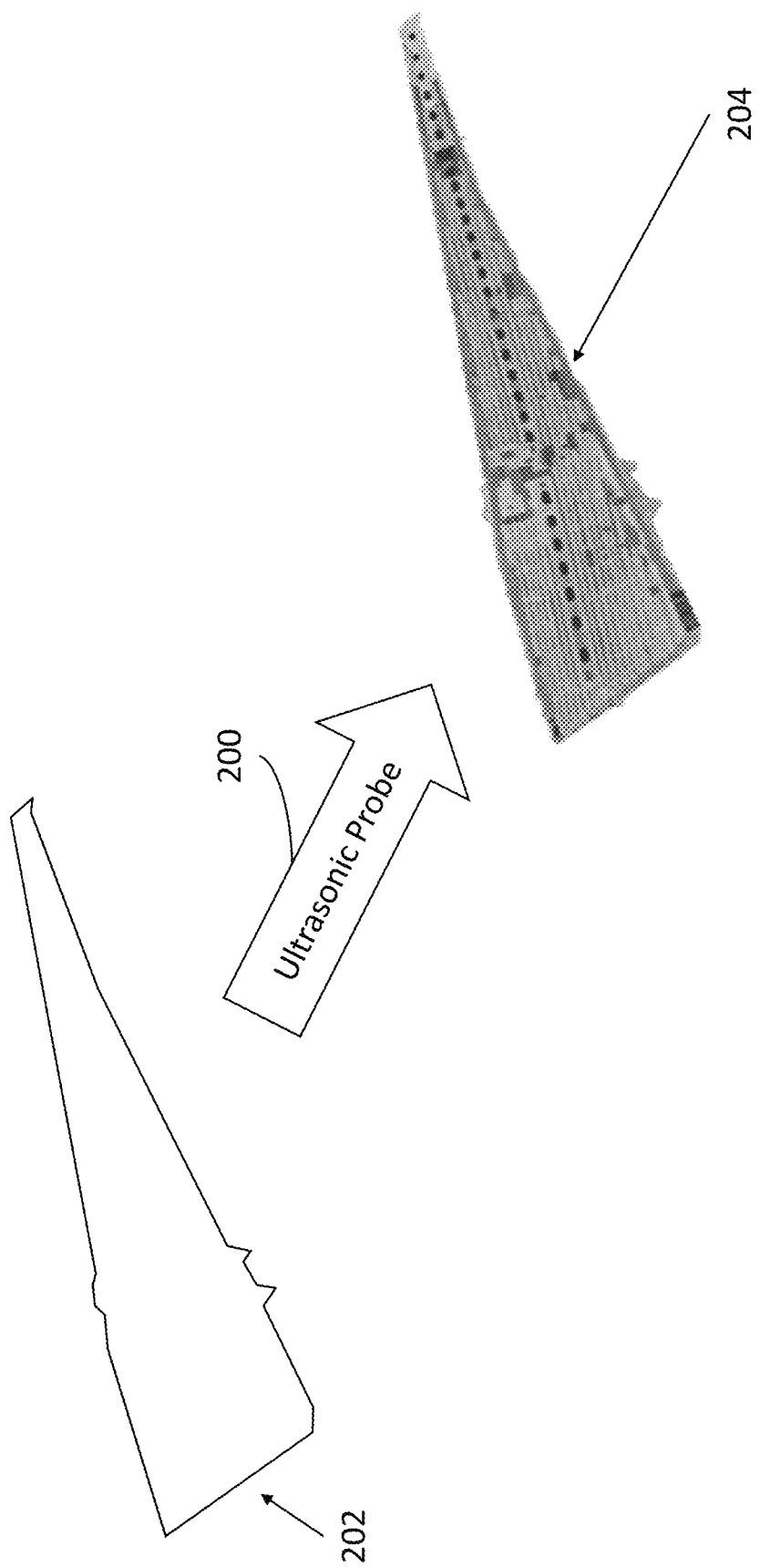
FIG. 2 graphically shows non-destructive test scans of an aircraft wing.

FIG. 2 graphically shows a non-destructive test scan of an aircraft wing. The aircraft wing 202 may be the wing of aircraft 1 shown in FIG. 1.

An ultrasonic probe 200 that gathers data may be configured to both emit and receive an ultrasonic pulse. An example of an ultrasonic probe is described in U.S. Pat. No. 7,562,576, the entire contents of which are hereby incorporated by reference. An ultrasonic probe may be placed in contact with a surface of a panel or component (e.g., a wing or the center wing box panel skin) panel skin) that is to be inspected. In certain examples, the probe may emit an ultrasonic pulse that passes through the component, is reflected by a rear face of the panel, and is received by the probe.

In certain examples, two types of a data may be acquired. The first is data on the amplitude of the signal (e.g., the form of the signal). The second is data on the time of flight of the signal (e.g. the return time of the signal). In certain examples, this data may be compared to a reference signal to determine (e.g., if the actual versus reference is outside of a range) the presence of delamination in the component.

In certain examples, the output from the data from the probe may be provided in the form of a c-scan 204. This may be presented to a user on a display device as an image. The image may be analyzed by inspectors to determine if delamination or other issues may be present in the analyzed component. Analysis of such data may be used to detect inner flaws within a component that may have a detrimental effect on the structural properties of the component (e.g., to ensure that the component can handle the stress that will placed on it when is use).

It will be appreciated that when testing is being performed, and even when a component has a defect, "most" (e.g., greater than 99%) of the component may be free of defects. Thus, inspectors may spend a large portion of their time on areas of a component that have no problems. This evaluation process can adversely affect production of aircraft components and create bottlenecks in the production process. Certain examples herein propose techniques for generating visual and other data that may help an inspector narrow or focus on areas that may have detrimental issues.

Figure 3:
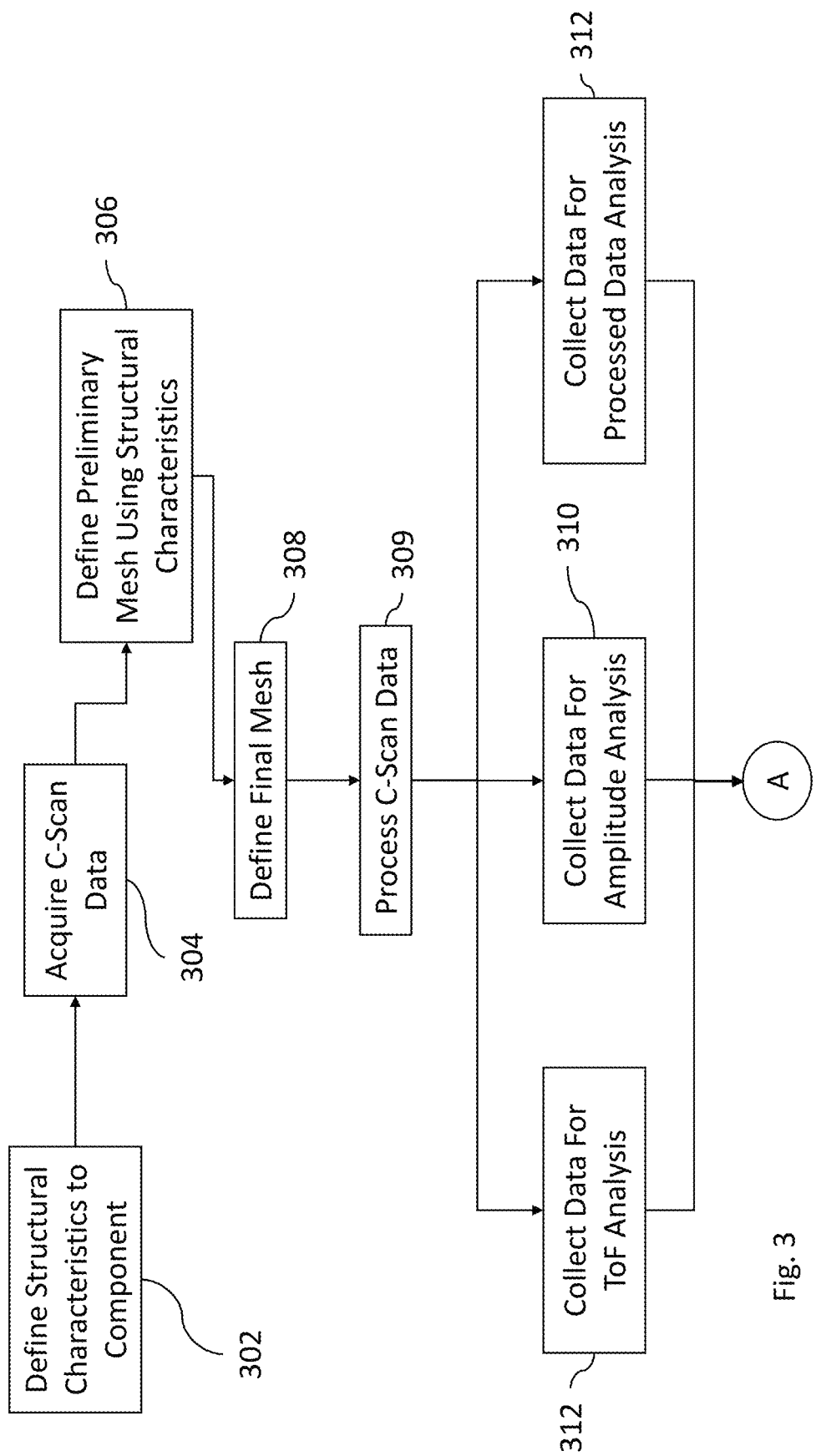
FIG. 3 is an example process for generating a mesh to analyze data according to certain example embodiments.

FIG. 3 is an example process for generating a mesh to analyze data according to certain example embodiments and FIGS. 4-6B are illustrative examples that aspects of the process from FIG. 3.

At 302, the structural criteria of the component that is being (or to be) analyzed is defined. This allows the geometry that makes up the component to represented or included into the C-Scan. This criteria may take into account engineering criteria that is to be applied to the component. The criteria may also take into account the manufacturing and inspection processes repeatability for the area or the component (e.g., those with high variability may have a more precise range defined for the associated area/component). In certain examples, the criteria may be based on the robustness of the component. The criteria specification may include, for example, defining a skin area, a stringer area, the skin under head of nail area in SRO area, and/or other geometric areas of the component being analyzed.

In certain example embodiments, the criteria may be combined with a mask or other data to define which portions of a C-scan correspond to which geometric or structural areas.

The criteria for the geometry associated with the c-scan data may be defined to allow, for example, for indications as small as 25 $mm^2$ (e.g., in the case of areas that are defined as class I), while other areas may be defined to note 150 $mm^2$ indications (e.g., in the case of areas that are defined as class II.1).

At 304, the C-Scan data may be acquired for a component that is being inspected. In certain examples, multiple instances of data are acquired for one component (e.g., a given wing). C-Scan can refer to the image that is produced or generated based on the data collected via an ultrasonic probe. In certain examples, the C-Scan image can show a combination of measurements that are acquired based on the whole thickness of the component being tested. In certain examples, the image shows a cross-section of the component parallel to the surface being scanned. In certain examples, the relative signal amplitude or the time-of-flight data is displayed as a shade of gray or a color for each of the positions where data was recorded.

Figure 4:
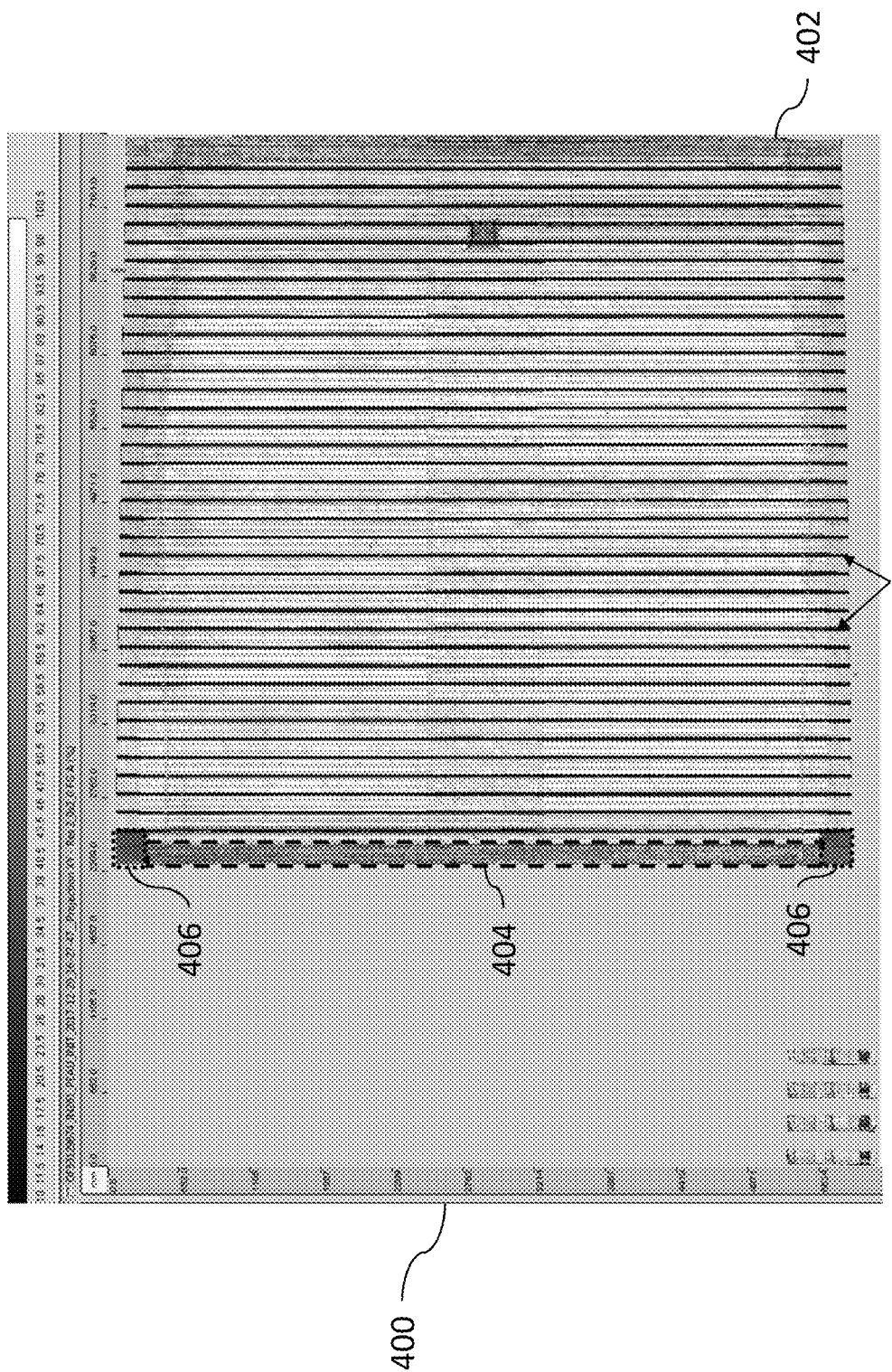
FIG. 4 in an example c-scan of an aircraft component according to certain example embodiments.

FIG. 4 shows an example of "raw" C-Scan data 402 that is presented as part of graphical user interface 400 on a computer. As can be seen there are different structural aspects to the underlying component including Carbon sacrificial ply 404, glass sacrificial ply 406, and stringers 408 (e.g., the dark lines indicated by 408).

At 306, a preliminary mesh 500 is defined over the raw scan data by taking into account the structural characteristics of the component that is being analyzed. In certain examples, the size of the individual cells in the mesh may be a function of engineering criteria to be applied on the part, the manufacturing and inspection processes repeatability, robustness, etc. . . . . . In certain examples, the preliminary definitions are stored in advance and applied to the C-Scan data at step 306. In certain examples, these definitions may act as a "mask" that is overlaid onto the C-Scan data to define the preliminary mesh.

Figure 5A:
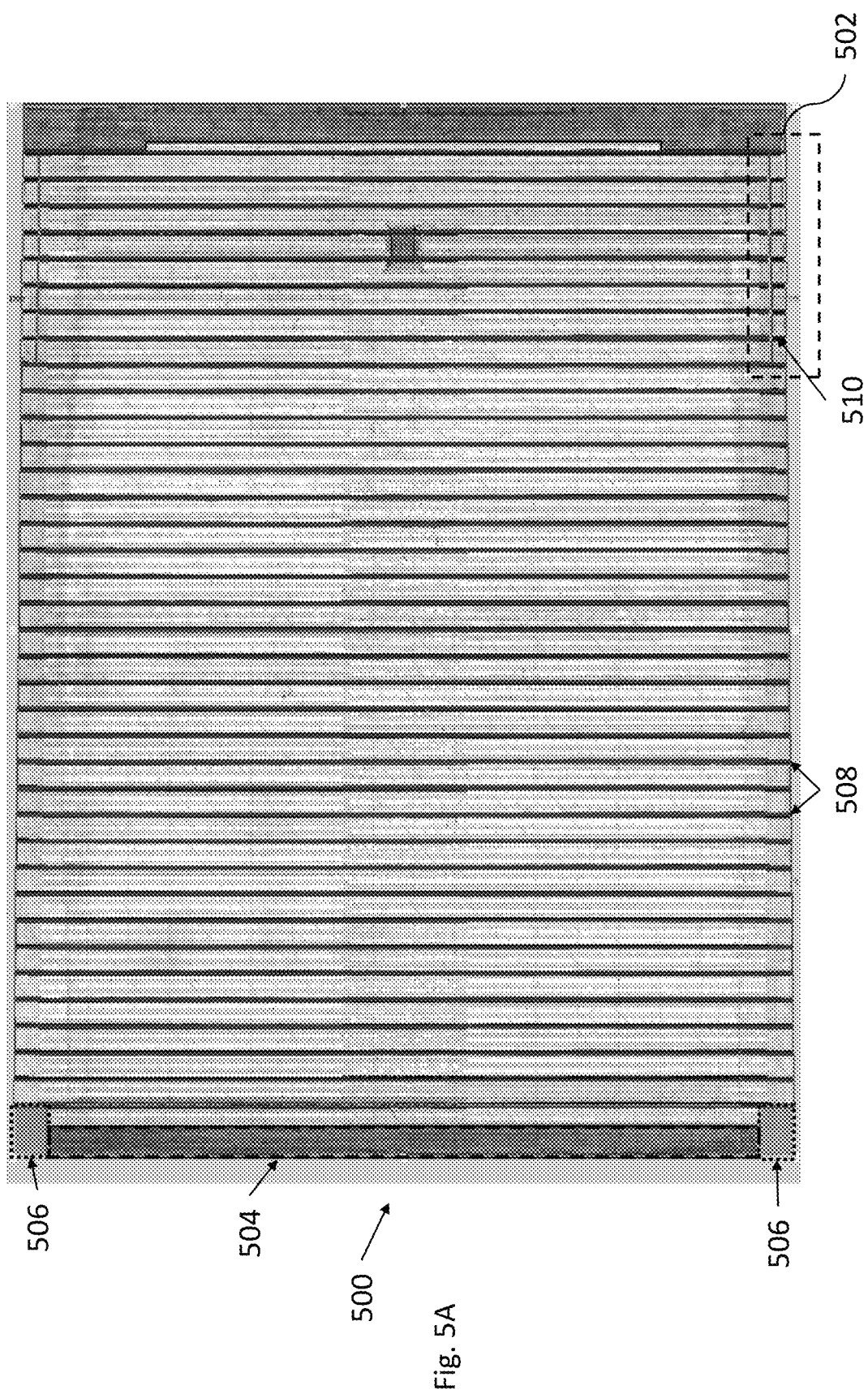
FIG. 5A in an example of how a preliminary mesh may be generated over the c-scan of FIG. 4 according to certain example embodiments.
Figure 5B:
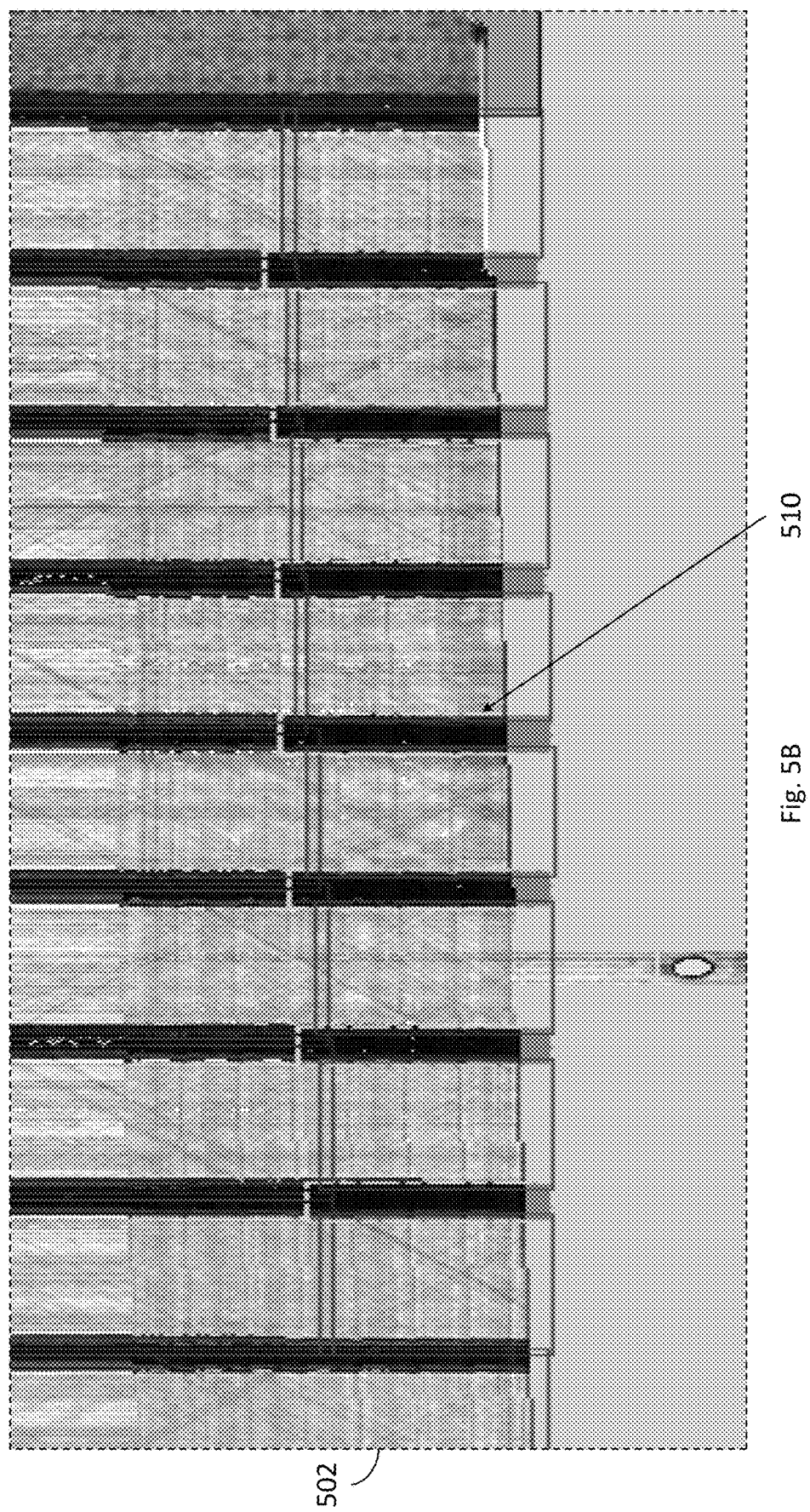
FIG. 5B is a zoomed in portion of FIG. 5A.

A preliminary mesh 500 is illustratively shown in FIG. 5A with reference to the C-Scan data from FIG. 4. Preliminary mesh 500 includes general meshes (508) (e.g., in class II.1), which may be defined in a color such as purple. Meshes 508 are defined to fit with inter-stringer areas of the component. The composite sacrificial plies (e.g., class II.1) are defined in over area 504 (in black) and the glass sacrificial plies (e.g., class II.1) are areas 506 (in green). Preliminary mesh 500 also includes mesh areas 510 that are defined with respect to stringer run out areas (e.g., class I). These are shown in blue and shown in expanded area 502 that is illustrated in FIG. 5B.

In certain example embodiments, the preliminary mesh areas may overlap with one another in at least one direction (e.g., vertically), in both directions (e.g., horizontally and vertically), or a plurality of directions (e.g., vertically, horizontally, and/or diagonally). The overlap amount may be based on a minimum indication criteria for a given portion/area of the component (e.g., as needed to satisfy engineering requirements for the component). For example, if a process should note at least 25 mm$^2$ indications then the overlap area may be set to 5 mm (e.g., with 5×5 mm=25 mm$^2$). This value may be modified or adjusted based on what indications within the data are to be noted.

Figure 6A:
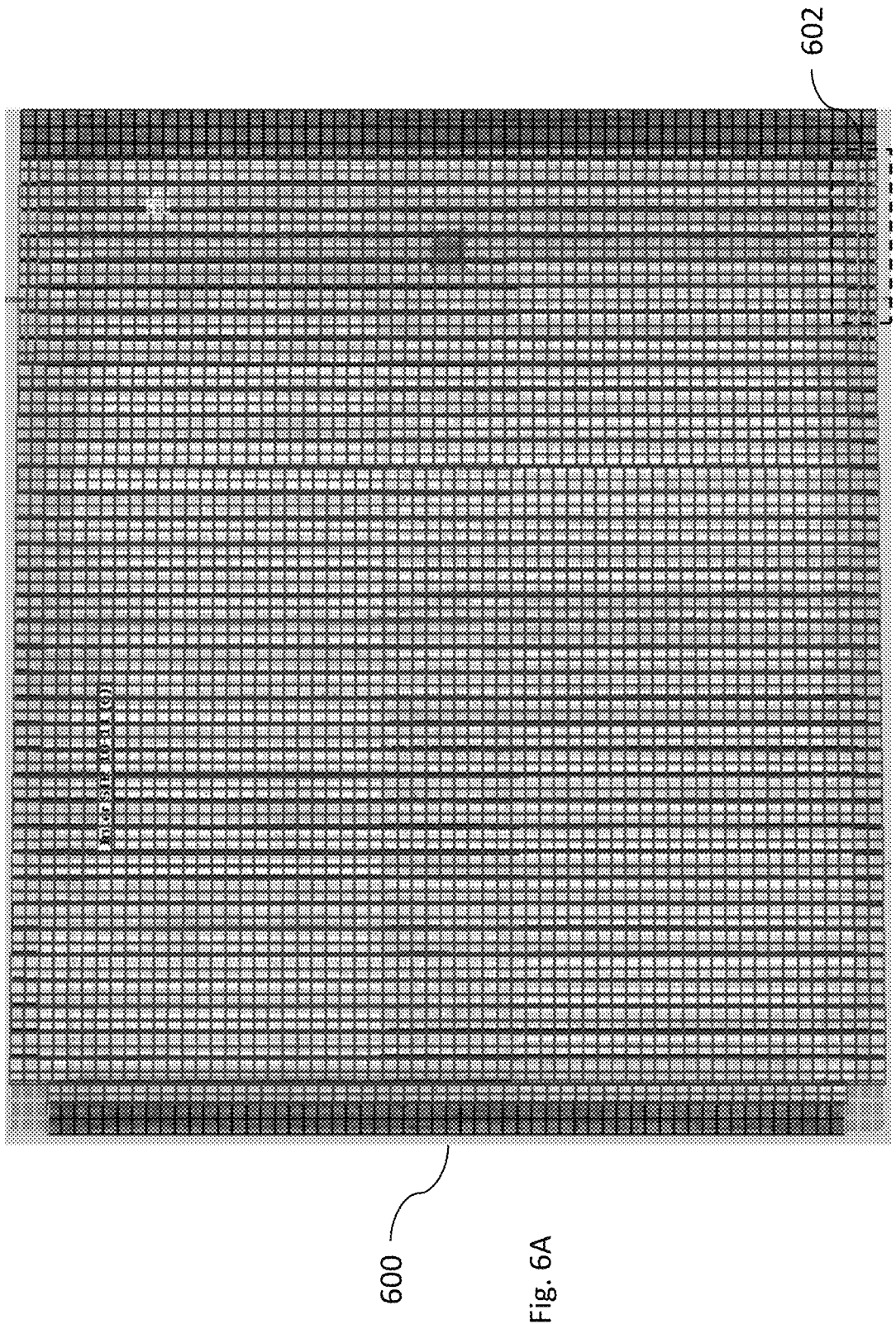
FIG. 6A in an example of how a mesh layout may be generated for the C-scan on FIG. 4 according to certain example embodiments.

Once the preliminary mesh is defined, then the final or refined mesh may be generated in step 308. An example generated mesh 600 is shown in FIG. 6A, with an expanded view of section 602 in FIG. 6B. It will be appreciated that this refined mesh is now generated with respect to the underlying structural elements of the component (e.g., the stringers, etc. . . . ) due to how the preliminary mesh is generated. The acquired C-Scan data may be processed at 309.

In certain examples, in defining the refined mesh, the process may account for the total surface of all indications and set that the indications need to be lower than 1% of the surface area being analyzed. For example, if the process should note 150 mm$^2$ indications, then the individual meshes within the revised mesh should be 12.5 mm×12.5 mm. Accordingly, the preliminary mesh 500 may be divided in a way to take this into account. In certain examples, the above discussed overlap may be included so that, for example, each mesh has 6 mm (or other length) of overlap. An example of this is shown in FIG. 6B.

Figure 6B:
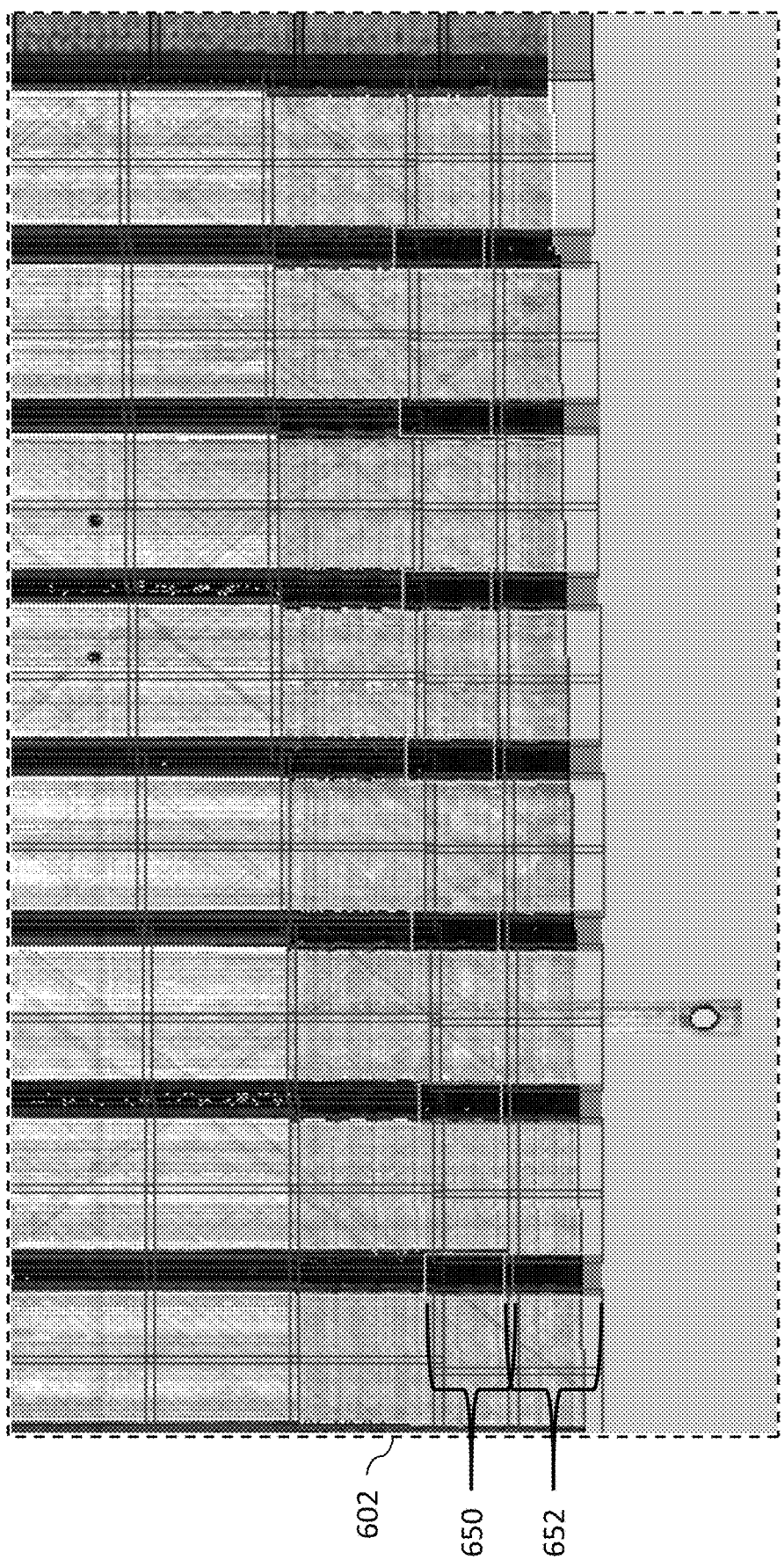
FIG. 6B is a zoomed in portion of FIG. 6A.

In FIG. 6B two mesh areas 650 and 652 (in blue) are defined over each of the stringer run out areas. Note that for each of the stringer run out areas there are two mesh areas 650 and 652 that extend in a vertical direction, but only one mesh area that extends in a horizontal direction. In certain examples, multiple mesh areas may be used, per stringer run out area (or other structural area), in a vertical, horizontal, or other direction.

After subdividing and generating the final meshes there may be thousands of mesh areas (e.g., more than 10,000 for an entire wing cover).

Each mesh area may now be analyzed for defects or other issues based on the underlying data acquired via the C-Scan.

As noted above, there may be more than one type of C-Scan performed for a given aircraft component. Two primary types of scans may include amplitude (e.g., used to look for volume porosity) and time of flight (e.g., used to look for layer porosity, inclusions, delaminations, and other indications that generate echoes) and associated analysis. Each mesh area may have data for amplitude and time of flight gathered for it.

In certain examples, the data for each mesh area may be divided into three separate types: 1) data to identify the particular mesh area; 2) statistical data; 3) and distribution of data vs the defined attenuation/amplitude range.

Amplitude analysis 310 may include the following data fields associated with identifying the particular mesh area: Area, width mesh, height mesh, etc. . . . .

Data is also collected for the time of flight analysis at 312. In certain examples, this may involve processing 2 kinds of C-Scans. First, a normal Time of Flight (ToF) C-Scan. And second, a computed gradient C-Scan. The computed gradient C-Scan can help to highlight "brutal" variations of Time of Flight (e.g., that may be representative of intermediate echoes).

Data for the normal ToF scan may include may include the following data fields associated with identifying the particular mesh area: Scanning time, area, width mesh, height mesh, and other data fields.

Data for the normal ToF scan may include the following distribution data fields: 1) Area Surface (mm2), 2) Min (dB), 3) Max (dB), 4) Mean (dB), 5) Median (dB), 6) Std dev (dB).

Data for the computed gradient may include may include the following data fields associated with identifying the particular mesh area: 1 scanning time, area, width mesh, height mesh, and other similar types of data fields.

Data for the computed gradient may include the following distribution data fields: 1) Area Surface (mm2), 2) Min (dB), 3) Max (dB), 4) Mean (dB), 5) Median (dB), 6) Std dev (dB).

At 312, data is collected for processed data analysis.

Figure 7:
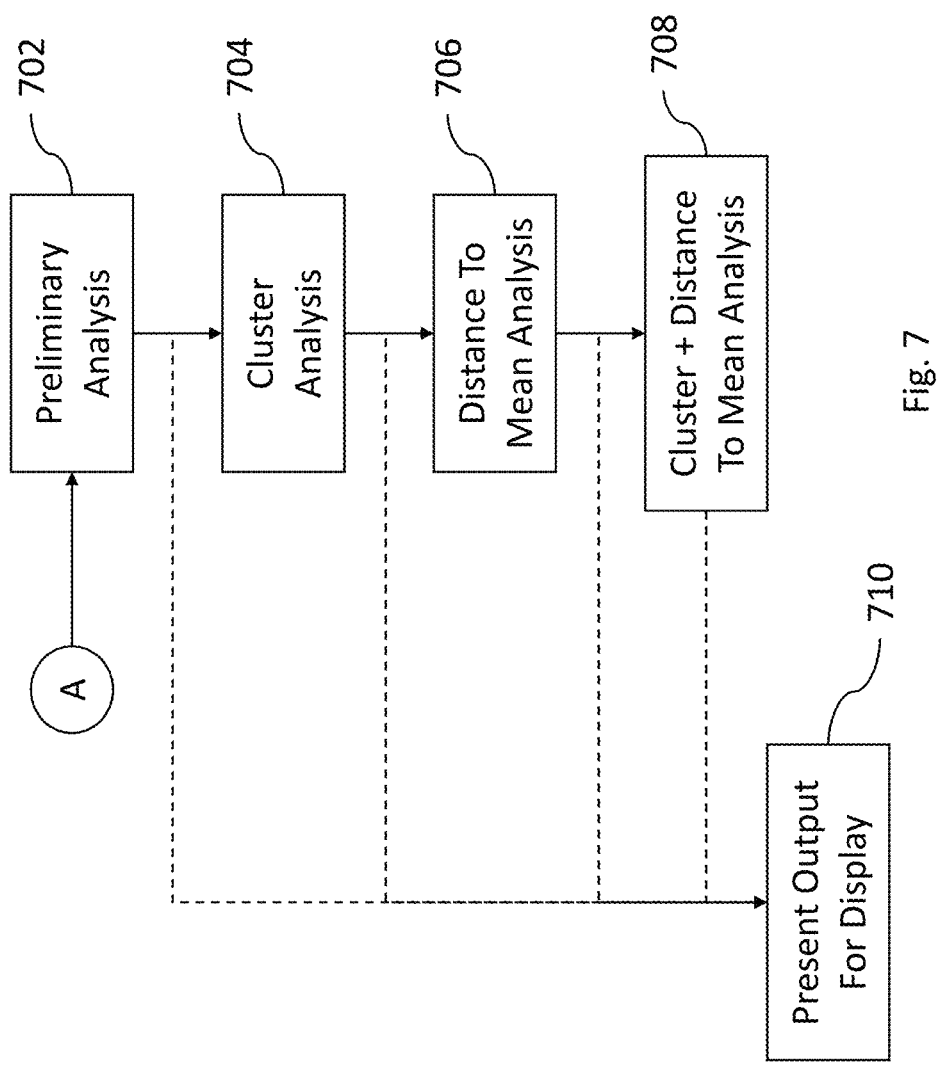
FIG. 7 is an example process for analyzing data defined with respect to the mesh shown in FIG. 6A according to certain example embodiments.

Once the data of each of the cells is acquired, the process moves to the steps described in FIG. 7.

FIG. 7 is an example process for analyzing data collected for a defined mesh—such as the mesh shown in FIG. 6A. FIGS. 8-11 show different heatmaps generated based on the previously defined mesh and associated data for each mesh cell. For example, each of the dots in FIGS. 8-11 corresponds to data from an associated mesh cell. In certain examples, a dot may represent one or more of the mesh cells.

The process shown in FIG. 7 includes one more process steps. After each processing step the resulting processing may be displayed to a user (e.g., in the form of the displays shown in FIGS. 8-11). FIGS. 8-11 represent the same area of the same component being analyzed.

Once the data is gathered as discussed above in connection with FIG. 3, the analysis portion of certain example embodiments may begin. In certain examples, the ToF and amplitude may be subjected to different analysis/processing steps for displaying information to user via one or more heatmaps via step 710 In certain examples, the ToF and amplitude processes may be equivalent in operation.

At 702, a preliminary analysis step is performed. For example, a user may specify (or parameters may be used to automatically set) that 150 mm$^2$ indications with more the 12 dB attenuation should be noted. Accordingly, using the data fields computed above, the following data values for those fields may be considered: 1) beyond −24 dB (mm$^2$), 2) between −24 dB and −18 dB (mm$^2$), 3) between −18 dB and −15 dB (mm$^2$), 4) between −15 dB and −12 dB (mm$^2$). If the sum of these data values from these 4 fields is greater than the 150 mm$^2$ threshold then a mesh cell may be colored and displayed in orange. Further, a mesh cell may be colored in red if the total is greater than a reportable threshold (e.g., as defined by engineering specifications, such as, for example 600 m$^2$). Accordingly, different criteria may be defined for a corresponding mesh cell, which is based on the underlying structural properties of the component being represented by that mesh cell.

Figure 8:
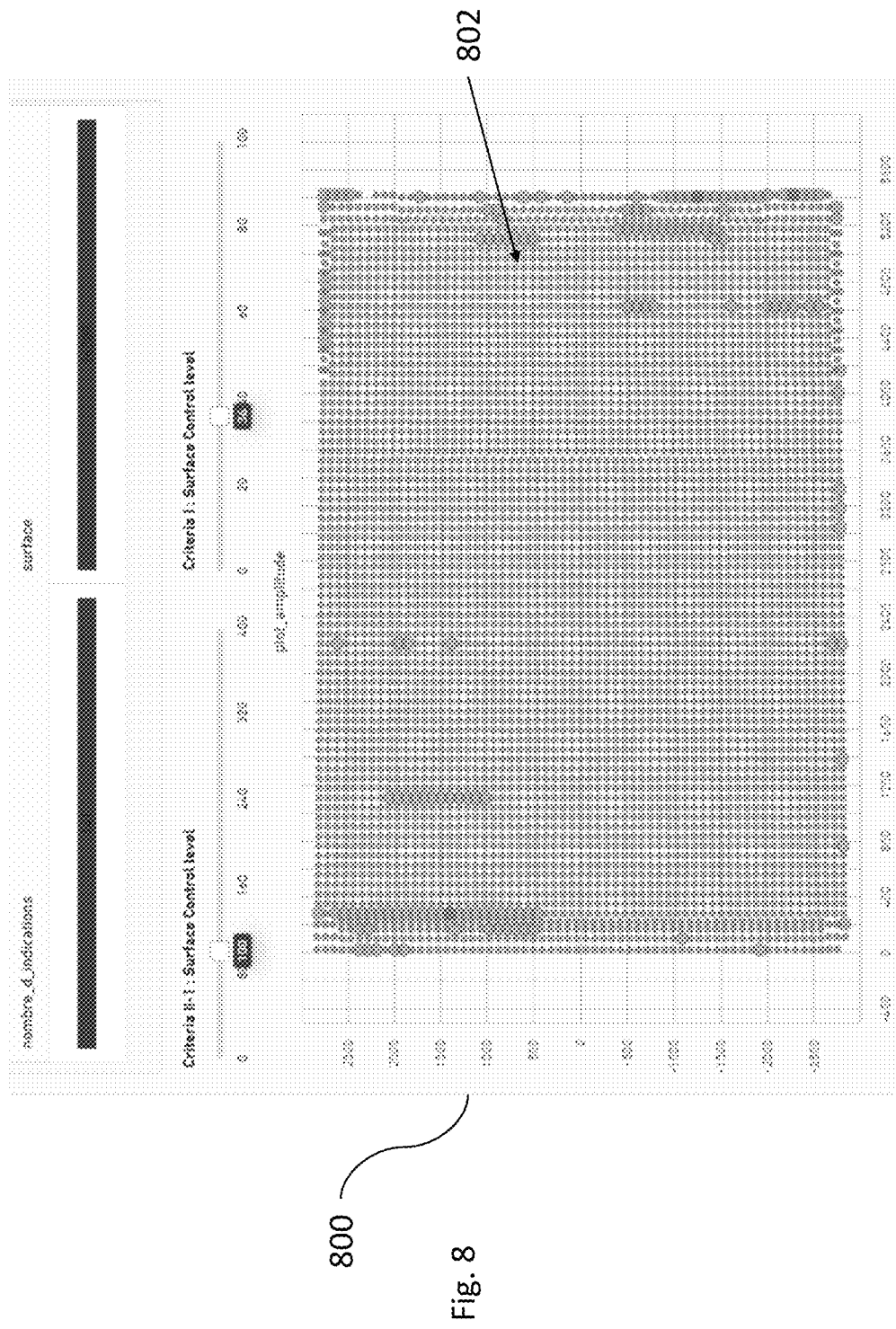
FIG. 8 is an example of a raw mesh display produced according to certain example embodiments.

FIG. 8 shows an example graphical user interface (GUI) 800 that includes a heatmap 802 with green, orange, and red indications. In certain examples, each dot corresponds to a mesh cell as shown and explained in connection with FIG. 6A. The GUI includes fields for showing the total number of indications (141) along with a number that represents the total (e.g., when considering all of the cells with potential indications) defect surface (26000).

Based on this preliminary analysis it may then be possible to estimate the maximum number of indications (e.g., a density criteria) by considering a ratio of surface vs size of notable indications. For example: a total surface of indications that have attenuation greater than a threshold (e.g., −12 dB)/surface with notable indications (e.g., @150 mm$^2$). In certain examples, the total ratio of a "bad" surface versus good surface may be calculated (e.g., if 1% or 2%, etc. . . . ).

Figure 9:
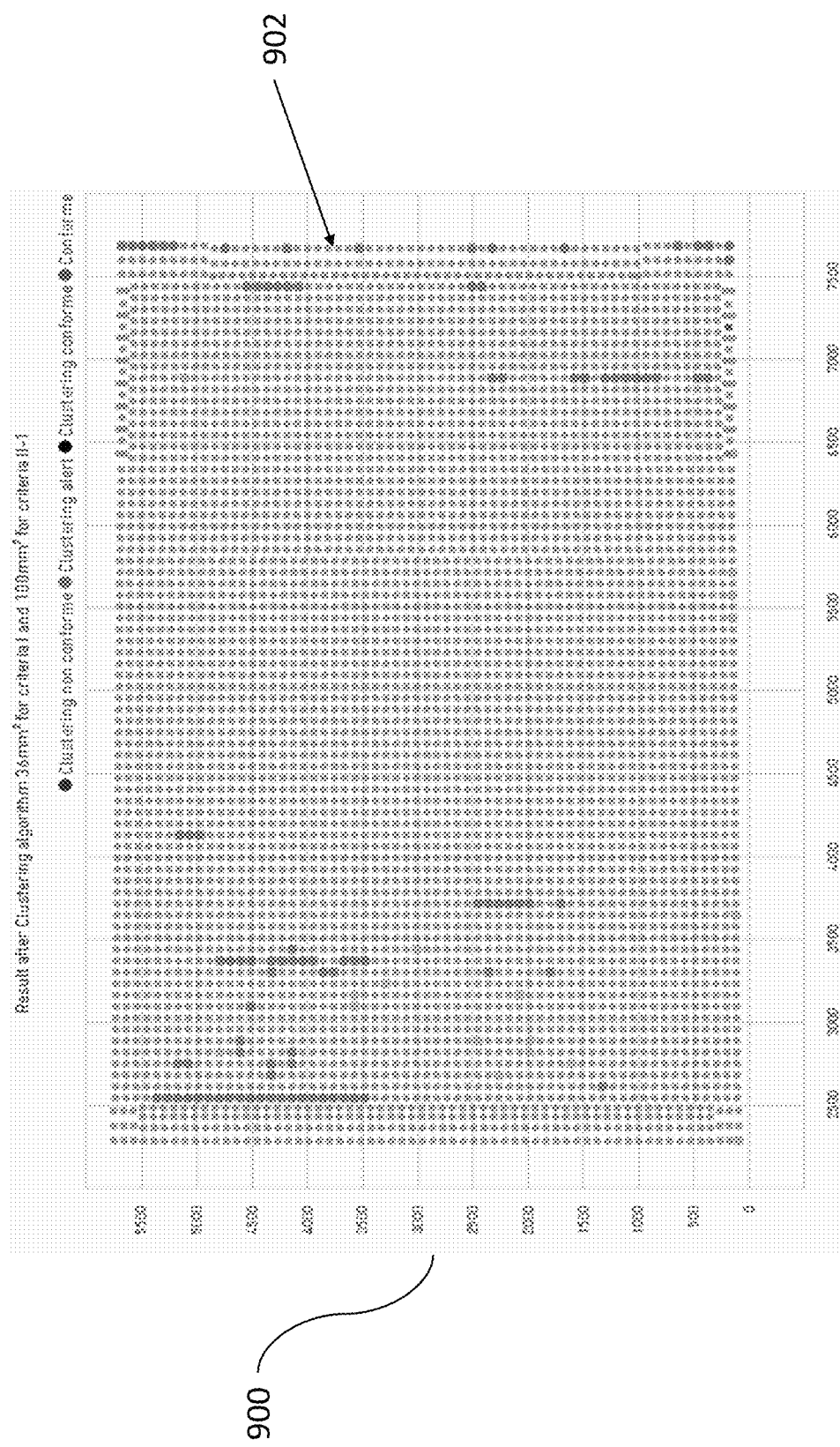
FIG. 9 is an example of a mesh display produced using a clustering process according to certain example embodiments.

Returning to FIG. 7, another analysis process may be performed. In step 704 a cluster analysis is performed. The result of such analysis is shown in FIG. 9. A cluster analysis may be used when indications are close together and/or on neighboring cells. In certain examples, the clustering process may: 1) check each cell to determine if the cell has more than a threshold number (e.g., more than 150 mm$^2$, this figure is determined following acceptance criteria) of pixels that are higher than a given attenuation threshold (e.g., 12 dB). For those cells matching this criteria, 2) the clustering process may check neighboring cells and determine if the neighboring cell has a quantity of pixels (e.g., that exceed the attenuation threshold) that is more than a quantity threshold (e.g., 150 mm$^2$). If so, 3) the cells will be grouped and a cluster of cells will be formed.

An example GUI 900 is shown in FIG. 9 with an example heatmap 902 that is produced using the clustering process described above. Green cells in 902 indicate that the surface of pixels with attenuation greater than a threshold is lower than a notable threshold (e.g., 25 mm$^2$ or 150 mm$^2$). Orange cells in 902 indicate that surface of pixels with attenuation greater than a threshold is higher than 150 mm$^2$ (e.g., a notable threshold), but there are less than 600 mm$^2$ (e.g., a reportable threshold) in the clustering group (e.g., groups of neighboring cells). Red cells in 902 indicate that surface of pixels with attenuation greater than a threshold is higher than 150 mm$^2$ and that the total surface of defect pixels in the clustering is greater than 600 mm$^2$ (e.g., the reportable threshold). Other thresholds may also be selected and this clustering process may allow for greater flexibility in identifying potential issues and focusing expert attention on such areas.

Figure 10:
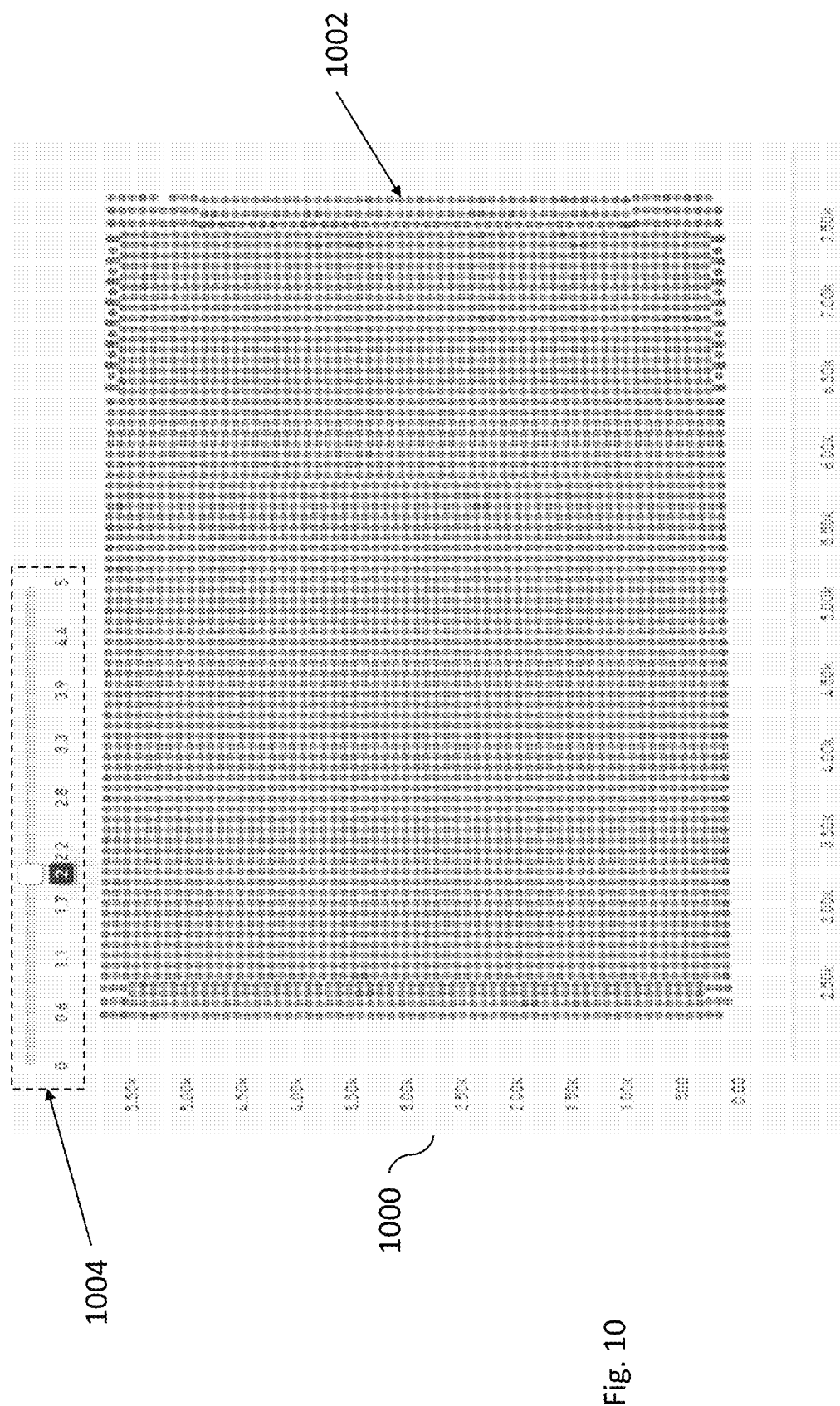
FIG. 10 is an example of a mesh display produced using a calculated distance to mean according to certain example embodiments.
Figure 11:
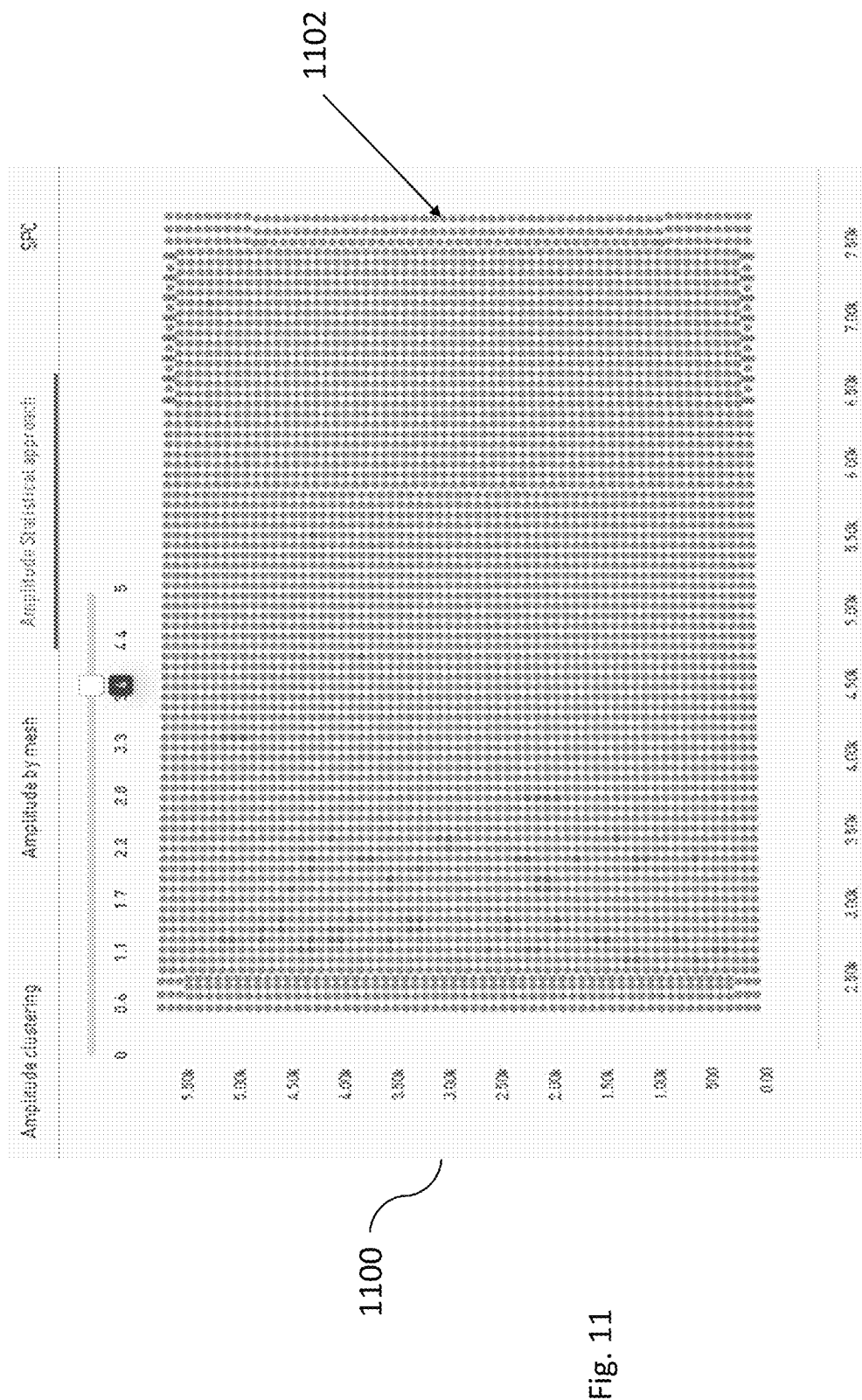
FIG. 11 is an example of a mesh display produced using a calculated distance to mean according to certain example embodiments.

In step 706, another analysis process may be performed that calculates the distance to the mean. The distance may be calculated as follows D=(value−mean of historical values)/ standard deviation of historical values. In certain examples the "value" in this equation is excluded from the mean and standard deviation of the historical values. In certain examples, the "value" can be the quantity of pixels in a cell above a threshold. In certain examples, the "value" can be the average amplitude (or ToF) value in a cell, or the like. The distance calculation for each mesh cell may than be plotted and displayed as is shown in FIG. 10. GUI 1000 includes a heatmap 1002 with plotted mesh cells. Also included in GUI 100 is a slider 1004 that allows a user to adjust a threshold for the distance value (e.g., values less than "2" in FIG. 10 or less than "4" in FIG. 11) are displayed in green while values greater than or equal to 2 are displayed in red).

In certain examples, the distance to analysis 706 is computed only on suspicious cells highlighted in the cluster analysis 704. In certain examples, the cluster analysis 704 is only computed for suspicious cells identified in 702. In certain examples, 706 is only performed for cells highlighted via 704 and 704 is only performed for those cells indicated as suspicious in 702.

A mesh may then be displayed in GUI 1100 where red cells indicate potential problem areas and green cells do not. Mesh 1102 may thus be used to highlight specific areas that are considered suspicious (e.g., areas considered suspicious using the considering the criteria defined earlier in the process). An inspector may then take this information to more precisely inspect the C-Scan data and or other data to ensure the aircraft component is compliant.

Figure 12:
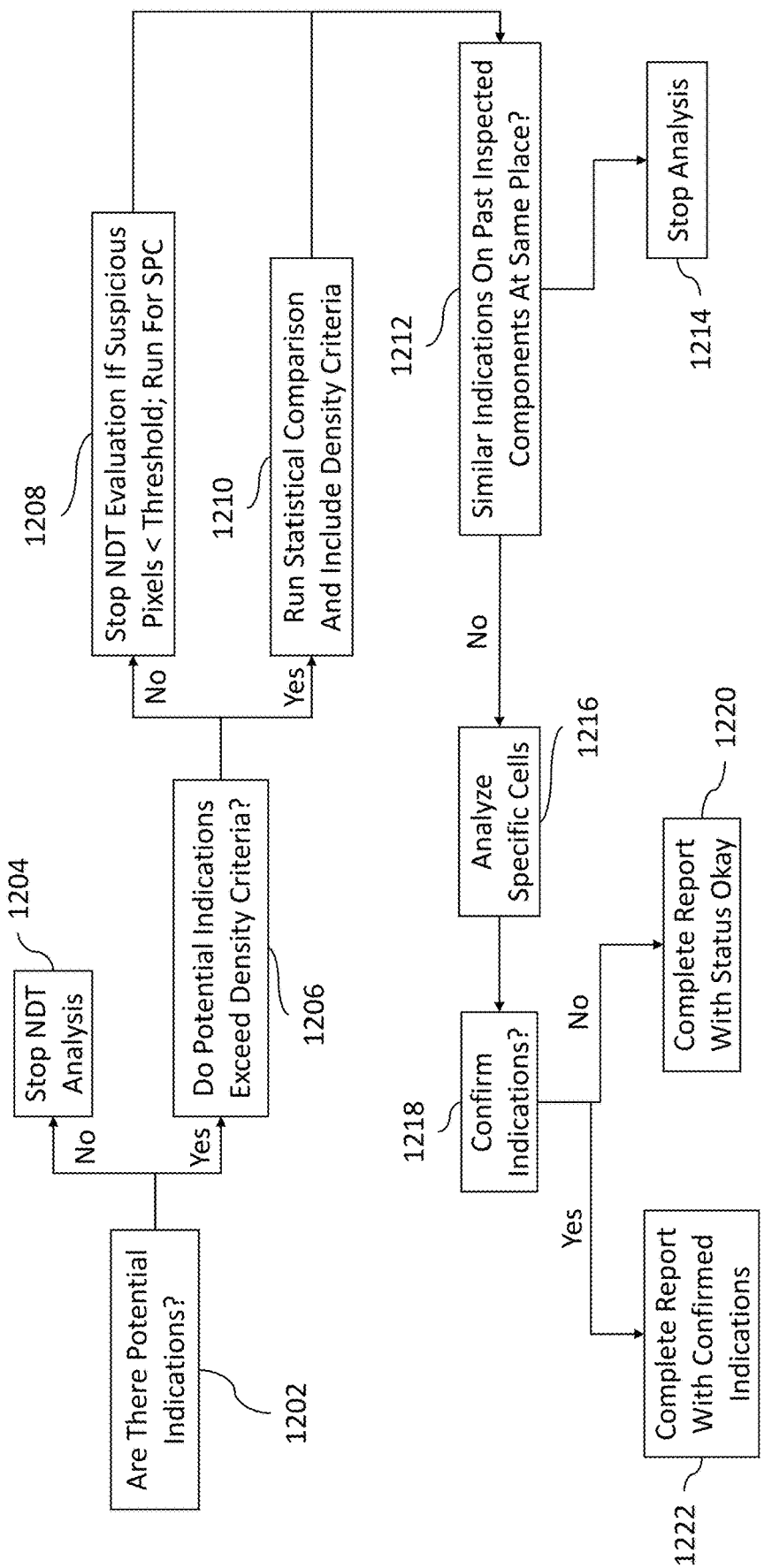
FIG. 12 is a first example process according to certain example embodiments.

FIG. 12 is a first example process according to certain example embodiments. The process shown in FIG. 12 may be associated with amplitude data. At step 1202, the process (e.g., a computerized process, such as a software module or program) may be determine if there are potential indications in a mesh cell or a group of mesh cells. If there is no indication, then at step 1204, no further analysis is needed and the process is stopped and it shall be linked to 1220. In certain examples it is stopped for that cell (or group of cells) and another cell (or group of cells) is selected to determine if there are indications. Thus, step 1204 may loop back to step 1202 in certain example embodiments.

At 1206, the process determines if the number of potential indications in that cell (herein "a cell" includes one or more cells and a group of cells) exceeds a density criteria.

At 1208, the NDT evaluation is stopped if the quantity of pixels in the suspicious area is less than a reportable threshold. However, the analysis of the cell continues and is used for Statistical Process Control (SPC) (e.g., to be incorporated into historical data for that cell) and it is linked to 1220 (report completion with status OK).

At 1210, if the potential indications do exceed the criteria, then a statistical (historic) comparison is executed for that cell. The density criteria is set to not okay for the report that is being generated for this aircraft component (or an area of that component).

At 1212, the process determines if similar indications in the past (e.g., on previously inspect aircraft components) have occurred in the same place.

At 1214, if similar indications have occurred, then the analysis of the cell is stopped (e.g., and the process may return to 1202 with analysis of another cell).

At 1216, if similar indications have not occurred then the process is passed off to an inspector who performs a manual or detailed analysis of the area of the component associated with the mesh cell (e.g., by directly revising the C-Scan data).

At 1218, the inspector determines if the indications are confirmed.

At 1220, the report for that particular cell may be completed.

Specifically, the status of the cell may be set to OK. In certain examples, a database may be updated to reference that this indication was not confirmed. This data may be used to improve detection on further components.

At 1222, the report is completed with data indicating that the inspector did confirm the indications. Specifically, the analysis report for that cell may be completed with the confirmed indications in connection with the density and reportable criteria. A database of indications may be updated, which may be used in the future to improve a manufacturing process of the aircraft component.

Figure 13:
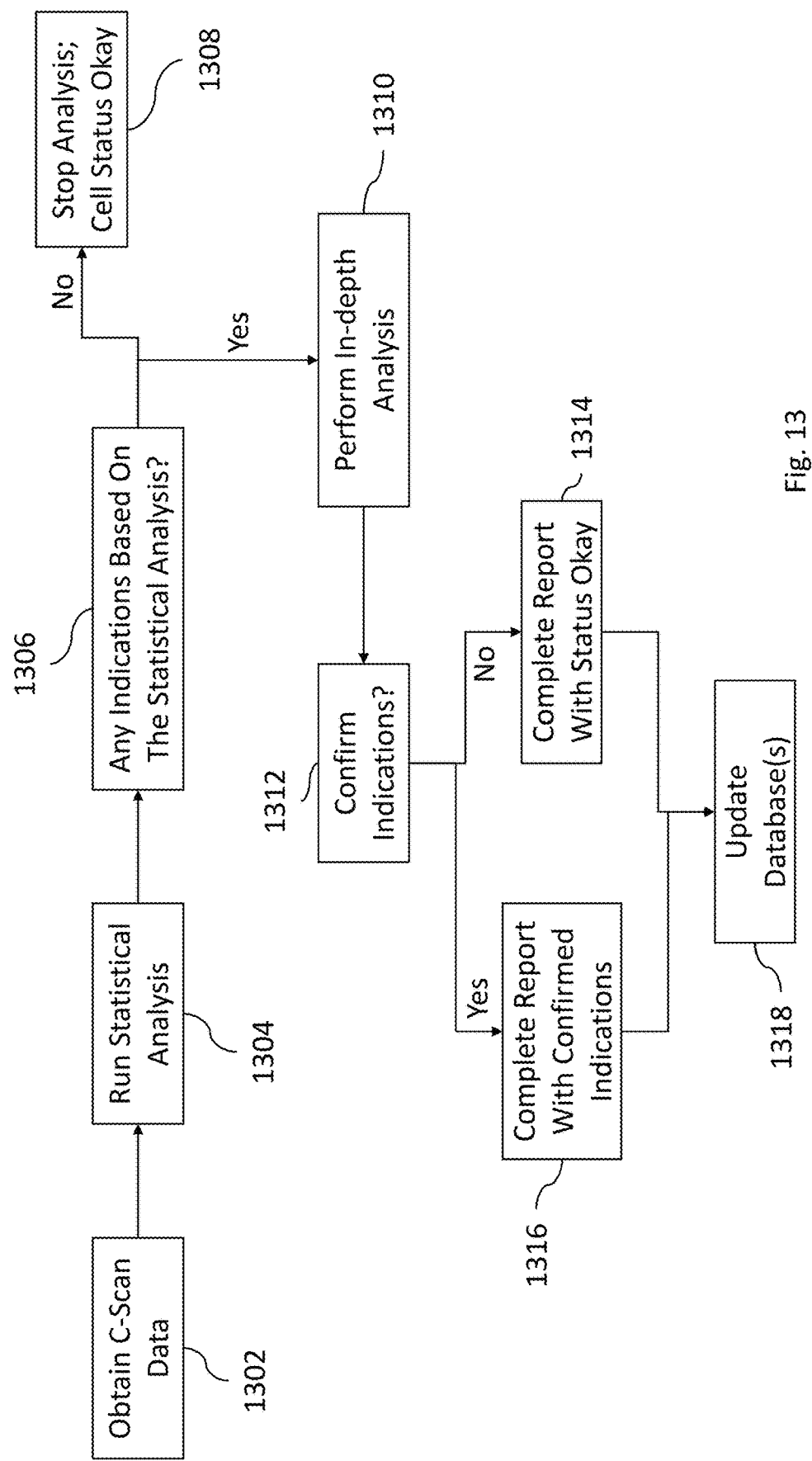
FIG. 13 is a second example process according to certain example embodiments.

FIG. 13 is a second example process according to certain example embodiments. FIG. 13 shows a process that considers Time of Flight and Gradient data (e.g., as discussed herein). Example criteria that may be used in the analysis of such data may be a deviation in relation to a theoretical value for the ToF data along with a standard deviation for the gradient with a quantity of pixels in a range (e.g., [0,3; +∞]). In certain examples, a reference may be created by considering the theoretical thickness. The measured data may then be compared to this theoretical value. In certain examples, a comparison may be made between the measured values and aircraft components that have been previously inspected.

At step 1302, C-Scan data is obtained. This may include loading and/or computing C-scan data. Such computing may include, for example, post-processing and filtering.

At 1304, statistical analysis of the C-Scan data is performed. This may include generating a mesh as described herein, the statistical data for each cell in the mesh and the creating heatmaps from that data.

At 1306, the process may indicate (e.g., via red mark or other visual indication, etc. . . . ) on a heat map that a potential problem exists for a cell (e.g., representing a flaw or deviation in that cell).

At 1308, if there is no indication then the process stops analysis of that cell and sets the status of that cell of okay.

However, at 1310, if there is an indication on a cell, then an inspector may run a detailed analysis of the specific cells.

At 1312, the inspector determines if the indication on the heatmap is confirmed. At 1314, if the indication is not confirmed, then the inspector (or the process) may complete the analysis report for that cell and set the status to OK.

At 1316, if the indication is confirmed, then the inspector (or the process) completes the analysis report for that cell with the confirmed indications vs the density and reportable criteria.

At 1318, relevant databases (e.g., a database of not-confirmed/confirmed indications) are updated to record whether the indication was confirmed or not (e.g., to improve future processes).

Figure 14:
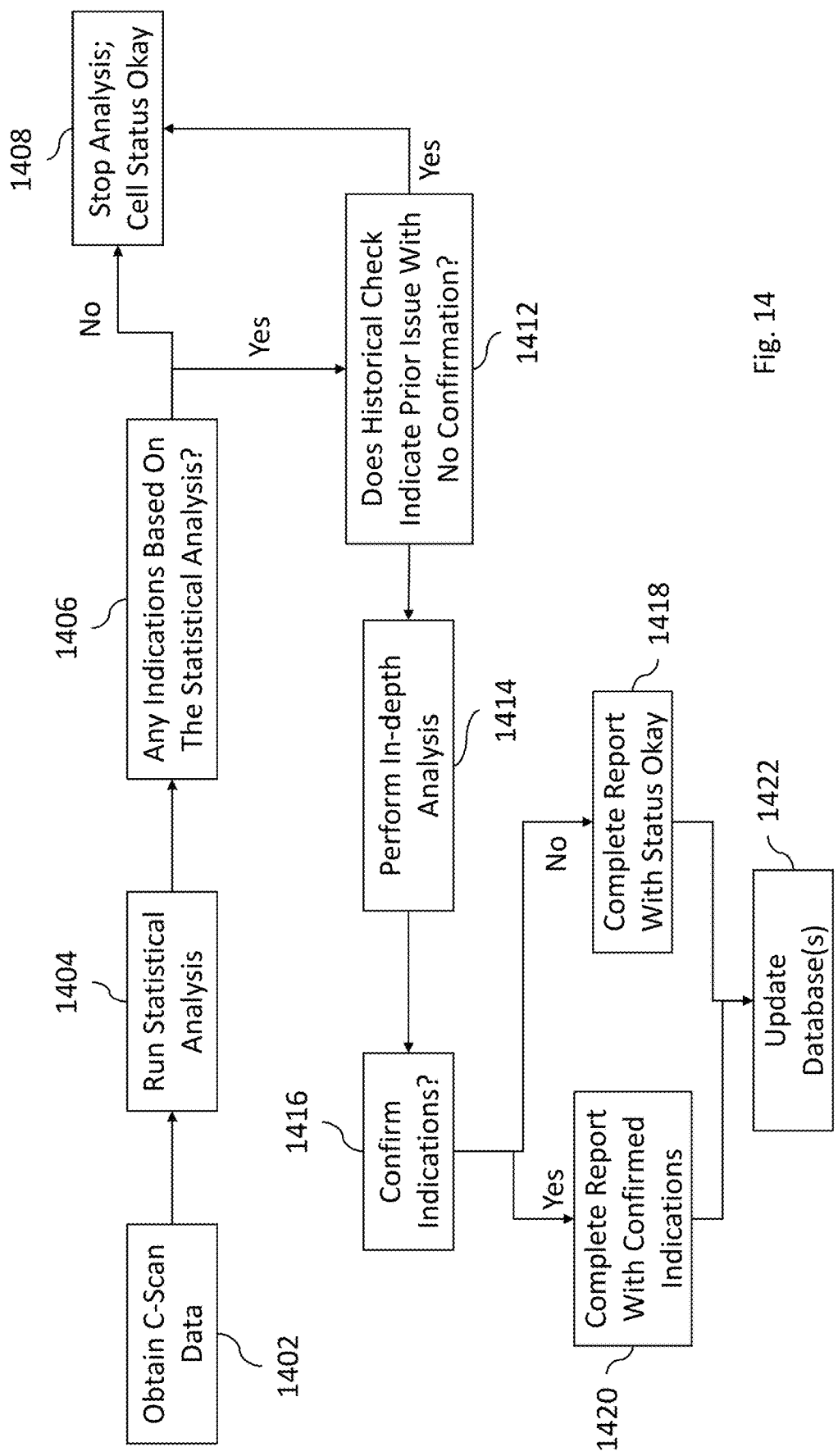
FIG. 14 is a third example process according to certain example embodiments.

FIG. 14 is a third example process according to certain example embodiments. The process shown in FIG. 14 is a variant of the process shown in FIG. 13. 1402, 1404, and 1406 are similar to 1302, 1304, and 1306.

At 1408, if there are no indications, then the analysis of the cell is stopped and the cell status is set to okay.

If there are indications, then at 1412, the process performs another determination. Specifically, the process determines whether defects were detected on this component, in this cell, and that the inspections revealed that these defects are not known. This "historical" look provides a second level of analysis.

If the historical check does indicate that this issue was known, the process moves to 1408 and 1410 where a warning of this situation is provided (e.g., either visually as part of the GUI or via a report, etc. . . . ).

On the other hand, if the historical check does not indicate that the issue was known, then the process moves to 1414 and a detailed analysis of the cell is performed.

At 1416, the inspector determines whether the indications are confirmed.

Steps 1418, 1420, 1422 then proceed similar to steps 1314, 1316, and 1318.

As noted above, the processes shown in FIGS. 12, 13, and 14 may be repeated on a per cell (or group of cells) basis.

Figure 15:
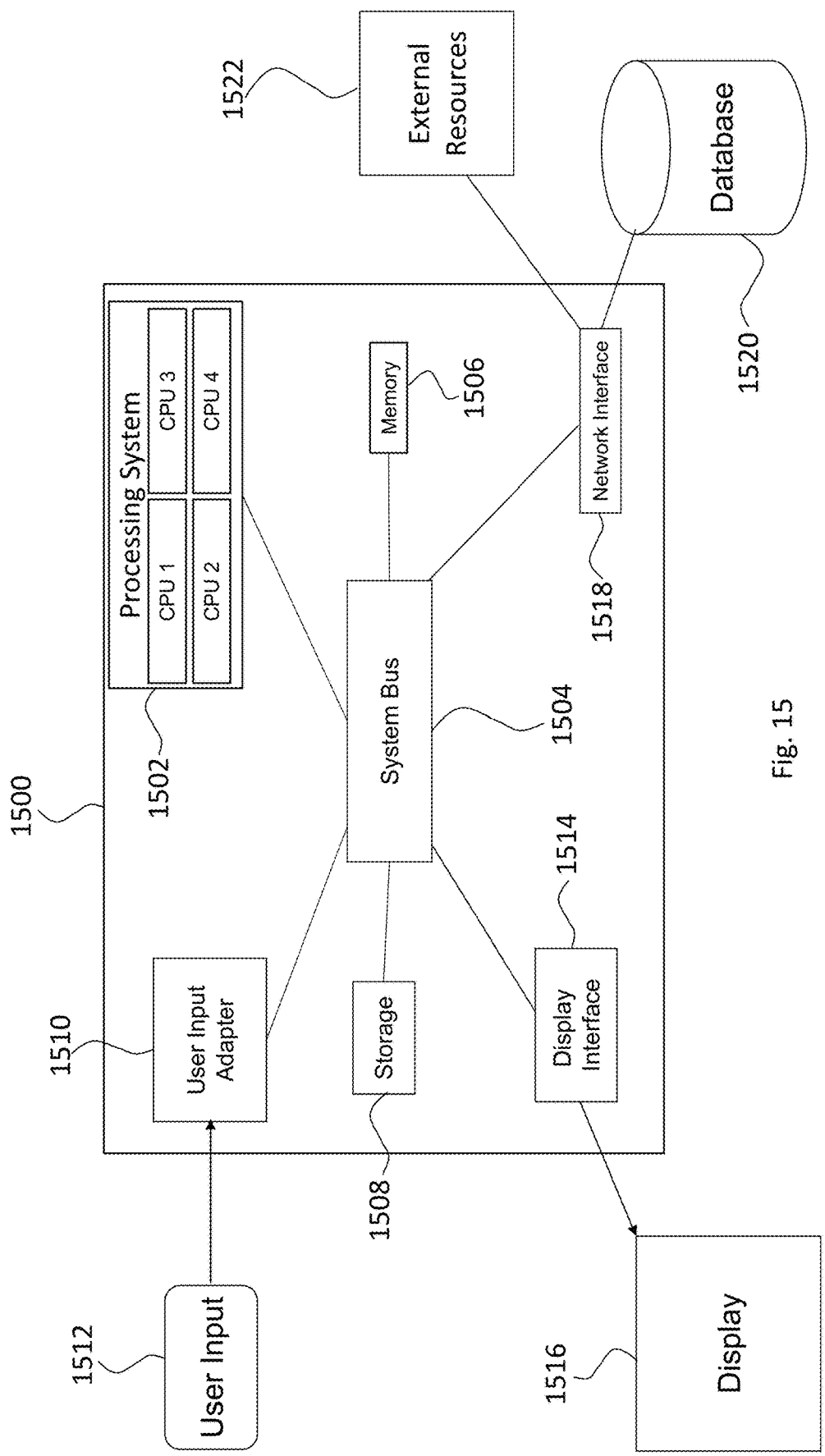
FIG. 15 shows an example computing device that may be used in some embodiments to implement features described herein.

FIG. 15 is a block diagram of an example computing device 1500 (which may also be referred to, for example, as a "computing device," "computer system," or "computing system") according to some embodiments. In some embodiments, the computing device 1500 includes a processing system 1502, which may include one or more hardware processors; one or more memory devices 1506 (e.g., volatile storage); one or more storage devices 1508 (e.g., non-volatile storage); one or more network interface devices 1518; one or more display interfaces 1514; and one or more user input adapters 1510; and a system bus 1504 to allow the previously mentioned components to communicate with one another. Additionally, in some embodiments, the computing device 1500 is connected to or includes a display device 1516, user input device 1512, database 1520, and/or external resources 1522. As will explained below, these elements are hardware devices (for example, electronic circuits or combinations of circuits) that are configured to perform various different functions for the computing device 1500.

In some embodiments, each or any of CPU 1, 2, 3, or 4 includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors uses an instruction set architecture such as x86 or Advanced RISC Machine (ARM).

In some embodiments, each or any of the memory devices 1506 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processing system 1502). Memory 1506 and storage 1508 devices are examples of non-volatile computer-readable storage media and may form, for example, a storage system. Such a storage system may store files, databases, records, and the like In some embodiments, each or any of the network interface devices 1518 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1514 is or includes one or more circuits that receive data from processing system 1502, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1516, which displays the image data. Alternatively or additionally, in some embodiments, each or any of the display interfaces 1514 is or includes, for example, a video card, video adapter, or graphics processing unit (GPU).

In some embodiments, each or any of the user input adapters 1510 is or includes one or more circuits that receive and process user input data from one or more user input devices 1512 that are included in, attached to, or otherwise in communication with the computing device 1500, and that output data based on the received input data to the processing system 1502. Alternatively or additionally, in some embodiments each or any of the user input adapters 1510 is or includes, for example, a PS/2 interface, a USB interface, a touchscreen controller, or the like; and/or the user input adapters 1510 facilitates input from user input devices (not shown in FIG. 15) such as, for example, a keyboard, mouse, trackpad, touchscreen, etc. . . . . .

In some embodiments, the display device 1516 may be a Liquid Crystal Display (LCD) display, Light Emitting Diode (LED) display, or other type of display device. In embodiments where the display device 1516 is a component of the computing device 1500 (e.g., the computing device and the display device are included in a unified housing), the display device 1516 may be a touchscreen display or non-touchscreen display. In embodiments where the display device 1516 is connected to the computing device 1500 (e.g., is external to the computing device 1500 and communicates with the computing device 1500 via a wire and/or via wireless communication technology), the display device 1516 is, for example, an external monitor, projector, television, display screen, etc. . . . .

In various embodiments, the computing device 1500 includes one, or two, or three, four, or more of each or any of the above-mentioned elements (e.g., the processing system 1502, memory devices 1605, network interface devices 1518, storage devices 1508, display interfaces 1514, and user input adapters 1510).

The computing device 1500 may be arranged, in various embodiments, in many different ways. As just one example, the computing device 1500 may be arranged such that the processors of processing system include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 1500 may be arranged such that: the processors of the processing system 1502 include two, three, four, five, or more multi-core processors; the network interface devices 1518 include a first network interface device that implements Ethernet and a second network interface device that implements WiFi and/or Bluetooth; and the memory devices 1506 include a RAM and a flash memory or hard disk.

As discussed herein, software modules and software processes (e.g., one of more of the steps in FIGS. 12-14, FIG. 3, FIG. 7, etc.) perform actions. Such actions are in actuality performed by underlying hardware elements according to the instructions that comprise the software module/process.

The hardware configurations shown in FIG. 15 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 15, (e) via other hardware arrangements, architectures, and configurations, and/or via combinations of the technology described in (a) through (e).

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Although process steps, algorithms or the like, including without limitation with reference to FIGS. 12-14, FIG. 3, FIG. 7, may be described or claimed in a particular sequential order, such processes may be configured to work in different orders. For example, steps 704 and 706 in FIG. 7 may be performed in reverse as shown in FIG. 7. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A method of processing ultrasonic data of an ultrasonic probe applied to an area of an aircraft component that includes carbon fiber reinforced polymer, the method comprising:
   obtaining c-scan data of an area of the aircraft component that includes the carbon fiber reinforced polymer;
   generating a first mesh with respect to the c-scan data, the first mesh being generated with respect to the structural characteristics of the area of the aircraft component;
   generating a refined mesh by dividing cells with in the first mesh;
   calculating, for each cell of the refined mesh, amplitude data that is based on an amplitude C-Scan;
   calculating, for each cell of the refined mesh, time of flight (ToF) data based on a ToF C-Scan;
   for a plurality of the mesh cells of the refined mesh, calculating a distance to a mean value as a function of a mean of historical values and a standard deviation of the historical values; and
   generating and displaying a heatmap based on the calculated amplitude and/or ToF data, wherein each cell or group of cells of the refined mesh represents a location within the heatmap, wherein the heatmap is based on the calculated distance to the mean.

2. The method of claim 1, wherein a first mesh cell of the generated refined mesh overlaps with other mesh cells in the generated refined mesh.

3. The method of claim 2, wherein an amount of overlap is calculated as a function of a predetermined size of indications in data obtained from the C-Scan amplitude and/or C-Scan ToF.

4. The method of claim 1, further comprising performing a clustering process for each mess cell, wherein the generated heatmap is based on the performed clustering process.

5. The method of claim 1, wherein the first mesh includes differently sized mesh areas that correspond to respective structural characteristics of different areas of the aircraft component.

6. The method of claim 1, wherein the aircraft component is a wing of the aircraft.

7. A method of processing ultrasonic data of an ultrasonic probe applied to an area of an aircraft component that includes carbon fiber reinforced polymer, the method comprising:
   obtaining c-scan data of an area of the aircraft component that includes the carbon fiber reinforced polymer;
   generating a first mesh with respect to the c-scan data, the first mesh being generated with respect to the structural characteristics of the area of the aircraft component;
   generating a refined mesh by dividing cells with in the first mesh;
   calculating, for each cell of the refined mesh, amplitude data that is based on an amplitude C-Scan;
   calculating, for each cell of the refined mesh, time of flight (ToF) data that is based on a ToF C-Scan;
   performing a clustering process for each mess cell, wherein the generated heatmap is based on the performed clustering process, wherein the clustering process includes:
   for a plurality mesh cells, determining a first set of cells for which there are more than a threshold number of pixels with higher than an attenuation threshold;
   for the first set of cells, determining whether neighboring cells have a quantity of pixels that are more than a threshold; and
   forming a cluster of cells based on those ones of the first set of cells that have neighboring cells with more than the quantity, and
   generating and displaying a heatmap that is based on the calculated amplitude and/or ToF data, wherein each cell or group of cells of the refined mesh represents a location within the heatmap.

8. The method of claim 7, wherein a first mesh cell of the refined mesh overlaps with other mesh cells in the refined mesh.

9. The method of claim 8, wherein an amount of overlap is calculated as a function of a size of indications to be detected.

10. The method of claim 7, wherein the first mesh includes differently sized mesh areas that correspond to respective structural characteristics of different areas of the aircraft component.

11. The method of claim 7, wherein the aircraft component is a wing of the aircraft.

12. A non-transitory computer readable storage medium storing computer readable instructions for using with a computer system that includes at least one hardware processor, the stored computer readable instructions comprising instructions that cause the computer system to:
   obtain c-scan data of an area of the aircraft component that includes the carbon fiber reinforced polymer;
   generate a first mesh with respect to the c-scan data, the first mesh being generated with respect to the structural characteristics of the area of the aircraft component;
   generate a refined mesh by dividing cells with in the first mesh;
   calculate, for each cell of the refined mesh, amplitude data that is based on an amplitude C-Scan;
   calculate, for each cell of the refined mesh, time of flight (ToF) data that is based on a ToF C-Scan;
   perform a clustering process for each cell of the refined mesh, wherein the clustering process includes:
   for a plurality of the cells of the refined mesh, determine a first set of the cells wherein each of the cells has more than a threshold number of pixels with higher than an attenuation threshold;
   for each cell of the first set of the cells, determine whether neighboring ones of the cells have a quantity of pixels more than a threshold; and
   form a cluster of the cells based on those cells of the first set of cells that have neighboring cells with more than the quantity of pixels, and
   generate and display a heatmap that is based on the calculated amplitude and/or ToF data, wherein each cell or group of cells of the refined mesh represents a point within the heatmap, wherein the generated heatmap is based on the clustering process.

13. The non-transitory computer readable storage medium of claim 12, wherein a first mesh cell of the refined mesh overlaps with other mesh cells in the refined mesh.

14. The non-transitory computer readable storage medium of claim 13, wherein an amount of overlap is calculated as a function of a predetermined size of indications in data obtained from the calculated amplitude and/or the ToF data.

15. The non-transitory computer readable storage medium of claim 12, wherein the first mesh includes differently sized mesh areas that correspond to respective structural characteristics of different areas of the aircraft component.

16. The non-transitory computer readable storage medium of claim 12, wherein the aircraft component is a wing of the aircraft.

\* \* \* \* \*